US007487453B2

(12) United States Patent
Goebel et al.

(10) Patent No.: US 7,487,453 B2
(45) Date of Patent: Feb. 3, 2009

(54) MULTI-MODAL CONTENT PRESENTATION

(75) Inventors: Steffen Goebel, Dresden (DE); Kay Kadner, Dresden (DE); Christoph Pohl, Dresden (DE); Falk Hartmann, Dresden (DE)

(73) Assignee: SAP AG, Walldorf (DE)

( * ) Notice: Subject to any disclaimer, the term of this patent is extended or adjusted under 35 U.S.C. 154(b) by 428 days.

(21) Appl. No.: 11/277,451

(22) Filed: Mar. 24, 2006

(65) Prior Publication Data

US 2007/0226635 A1 Sep. 27, 2007

(51) Int. Cl.
*G06F 3/00* (2006.01)
*G06F 17/00* (2006.01)

(52) U.S. Cl. ....................... 715/746; 715/251; 715/700; 715/727

(58) Field of Classification Search ................. 715/525, 715/251, 745, 866, 978, 746, 727
See application file for complete search history.

(56) References Cited

U.S. PATENT DOCUMENTS

| | | | | |
|---|---|---|---|---|
| 6,745,163 | B1 | 6/2004 | Brocious et al. | |
| 6,807,529 | B2 | 10/2004 | Johnson et al. | |
| 7,020,841 | B2 * | 3/2006 | Dantzig et al. | 715/727 |
| 7,107,533 | B2 * | 9/2006 | Duncan et al. | 715/727 |
| 7,210,098 | B2 * | 4/2007 | Sibal et al. | 715/205 |
| 2003/0046346 | A1 | 3/2003 | Mumick et al. | |
| 2003/0071833 | A1 | 4/2003 | Dantzig et al. | |
| 2003/0146932 | A1 | 8/2003 | Weng et al. | |
| 2005/0055635 | A1 * | 3/2005 | Bargeron et al. | 715/525 |
| 2005/0102606 | A1 | 5/2005 | Sasaki et al. | |

(Continued)

FOREIGN PATENT DOCUMENTS

| | | |
|---|---|---|
| EP | 1 526 447 | 4/2005 |

(Continued)

OTHER PUBLICATIONS

Hodas et al., NOVeLLA: A Multi-Modal Electronic-Book Reader with Visual and Auditory Interfaces, Apr. 6, 2001, International Journal of Speech Technology.*

(Continued)

*Primary Examiner*—Tadesse Hailu
*Assistant Examiner*—Nicholas S Ulrich
(74) *Attorney, Agent, or Firm*—Fish & Richardson P.C.

(57) ABSTRACT

A method is provided that includes receiving a user input, the user input having been input in a user interface in one of multiple modalities. The method also includes accessing, in response to receiving the user input, a multi-modality content document including content information and presentation information, the presentation information supporting presentation of the content information in each of the multiple modalities. In addition, the method includes accessing, in response to receiving the user input, metadata for the user interface, the metadata indicating that the user interface provides a first modality and a second modality for interfacing with a user. First-modality instructions are generated based on the accessed multi-modality content document and the accessed metadata, the first-modality instructions providing instructions for presenting the content information on the user interface using the first modality. Second-modality instructions are generated based on the accessed multi-modality content document and the accessed metadata, the second-modality instructions providing instructions for presenting the content information on the user interface using the second modality.

16 Claims, 20 Drawing Sheets

U.S. PATENT DOCUMENTS

| | | | |
|---|---|---|---|
| 2005/0131911 | A1 | 6/2005 | Chi et al. |
| 2005/0273759 | A1 | 12/2005 | Lucassen et al. |

FOREIGN PATENT DOCUMENTS

| | | |
|---|---|---|
| EP | 1 526 448 | 4/2005 |

OTHER PUBLICATIONS

Eric Blechsmitt et al., "An Architecture to Provide Adaptive, Synchronized and Multimodal Human Computer Interaction", *Multimedia* '02, published Dec. 1-6, 2002, Juan-Les-Pins, France, (pp. 287-290).

Robbie Schaefer et al., "A novel Dialog Model for the Design of Multimodal User Interfaces", published Jul. 11-13, 2004, Hamburg, Germany, (2 pages).

"3G Mobile Context Sensitive Adaptability-User Friendly Mobile Work Place for Seamless Enterprise Applications", *Project No. IST-2001-32407, RIML Language Specification Version* 2, published Mar. 17, 2004, (pp. 1-105).

Nicolas Chevassus, "A framework for authoring & exploiting multimodal documentation", *W3C Seminar*, published Jun. 21, 2005, (pp. 1-29).

Liu et al., "An Architecture of Wireless Web and Dialogue System Convergence for Multimodal Service Interaction Over Converged Networks," *Proceedings of the 27th Annual International Computer Software and Applications Conference*, Dallas, TX, 2003, 6 pages.

'Multimodal Architecture and Interfaces: W3C Working Draft' [online]. W3C, 2005, [retrieved on Apr. 17, 2007]. Retrieved from the Internet: <URL: http://www.w3.org/TR/2005/WD-mmi-arch-20050422/>, 15 pages.

* cited by examiner

110

```
<?xml version="1.0" encoding="UTF-8"?>
<html xmlns="http://www.w3.org/2002/06/xhtml2/"
   xmlns:xforms="http://www.w3.org/2002/06/xhtml2/"
   xmlns:xsi="http://www.w3.org/2001/XMLSchema-instance"
   xmlns:xsd="http://www.w3.org/2001/XMLSchema"
   xmlns:sel="http://www.w3.org/2004/06/diselect"
   xmlns:d3ml="http://www.snow-project.org/2005/11/d3ml"
   xsi:schemaLocation="http://www.w3.org/2002/06/xhtml2/schema/xhtml2+d3ml.xsd">
   <head>
      <d3ml:layout>
         <sel:select>
            <sel:when expr="outputMethod() = 'visual'">   301
               <d3ml:layout-container target-type="application/xhtml+xml">   (302)
                  <d3ml:row>   308
                     <d3ml:frame paginate="false">   820
      306A              <d3ml:content-ref ref="A"/>
                     </d3ml:frame>
                  </d3ml:row>
                  <d3ml:row>   310
                     <d3ml:column>   312
                        <d3ml:frame paginate="false">   822
      306E                 <d3ml:content-ref ref="E"/>
                        </d3ml:frame>
                     </d3ml:column>
                     <d3ml:column>   314
                        <d3ml:frame paginate="true">   824
      306B                 <d3ml:content-ref ref="B"/>
      306C                 <d3ml:content-ref ref="C"/>
      306D                 <d3ml:content-ref ref="D"/>
                        </d3ml:frame>
                     </d3ml:column>
                  </d3ml:row>
               </d3ml:layout-container>
            </sel:when>
            <sel:when expr="outputMethod() = 'voice'">   303
               <d3ml:layout-container target-type="application/ssml+xml">   (304)
                  <d3ml:column>
                     <d3ml:frame paginate="true">   826
                        <d3ml:content-ref ref="B"/>
                        <d3ml:content-ref ref="D"/>
                        <d3ml:content-ref ref="C"/>
                     </d3ml:frame>
                  </d3ml:column>
                  <d3ml:column>
                     <d3ml:frame paginate="false">   828
                        <d3ml:content-ref ref="A"/>
                     </d3ml:frame>
                  </d3ml:column>
               </d3ml:layout-container>
            </sel:when>
         </sel:select>
      </d3ml:layout>
   </head>
:
```

```
:
    <body>
      <section id="A">
        <div><a href="next.d3ml">Next book</a></div>
        <div><a href="previous.d3ml">Previous book</a></div>
      </section>
      <section id="B">
        <div>Alessandro Baricco: "City"</div>
      </section>
      <section id="C">
        <div>
          Other books by this author
          <ul>
            <li><a href="novacento.d3ml">Novacento</a></li>
            <li><a href="oceanomare.d3ml">Oceano Mare</a></li>
          </ul>
        </div>
      </section>
      <section id="D">
        <div>
          I like this book as its story involves several strands which are
          interwoven in an interesting way, thereby teaching a lot about
          boxing and football :)
        </div>
      </section>
      <section id="E">
        <div><a href="search.d3ml">Search</a></div>
        <div><a href="logout.d3ml">Logout</a></div>
      </section>
    </body>
</html>
```

```
<?xml version="1.0" encoding="UTF-8"?>
<html>
<head></head>
  <body>
    <table border="1">
      <tbody>
        <tr> <- 404
          <td>
402A        <div id="A">
              <div><a href="next.d3ml">Next book</a></div>
              <div><a href="previous.d3ml">Previous book</a></div>
            </div>
          </td>
        </tr>
        <tr> <- 406
          <td>
            <table border="1">
              <tbody>
                <tr>
                  <td> <- 408
402E                <div id="E">
                      <div><a href="search.d3ml">Search</a></div>
                      <div><a href="logout.d3ml">Logout</a></div>
                    </div>
                  </td>
                  <td> <- 410
402B                <div id="B">
                      <div>Alessandro Baricco: "City"</div>
                    </div>
402C                <div id="C">
                      <div>
                        Other books by this author
                        <ul>
                          <li><a href="novacento.d3ml">Novacento</a></li>
                          <li><a href="oceanomare.d3ml">Oceano Mare</a></li>
                        </ul>
                      </div>
                    </div>
402D                <div id="D">
                      <div>
                        I like this book as its story involves several strands which are
                        interwoven in an interesting way, thereby teaching a lot about
                        boxing and football :)
                      </div>
                    </div>
                  </td>
                </tr>
              </tbody>
            </table>
          </td>
        </tr>
      </tbody>
    </table>
  </body>
</html>
```

```
<?xml version="1.0" encoding ="UTF-8"?>
<!DOCTYPE vxml PUBLIC "-//W3C//DTD VOICEXML 2.0//EN" "http://www.w3.org/TR/voicexml20/vxml.dtd">
<vxml version="2.0" xmlns="http://www.w3.org/2001/vxml">
        <form id="B">
            <block>
                <prompt>
602B                <p><s>Alessandro Baricco: "City"</s></p>
                </prompt>
            </block>
        </form>
        <form id="D">
            <block>
                <prompt>
                    <p>
                        <s>
                            I like this book as its story involves several
602D                        strands which are interwoven in an interesting
                            way, thereby teaching a lot about boxing and
                            football :)
                        </s>
                    </p>
                </prompt>
            </block>
        </form>
        <form id="C">
            <link next="novacento.d3ml">
                <grammar mode="voice">
                    <rule id="novacento">Novacento</rule>
                </grammar>
            </link>
            <link next="oceanomare.d3ml">
                <grammar mode="voice">
                    <rule id="oceanomare">Oceano Mare</rule>
                </grammar>
            </link>
602C        <block>
                <prompt bargein="true" bargeintype="hotword">
                    <p>
                        <s>
                            Other books by this author
                            <emphasis>Novacento</emphasis>
                            <emphasis>Oceano Mare</emphasis>
                        </s>
                    </p>
                </prompt>
            </block>
        </form>
        <menu id="A">
            <prompt>
                Please say one of
602A            <enumerate />
            </prompt>
            <choice next="next.d3ml">Next book</choice>
            <choice next="previous.d3ml">Previous book</choice>
        </menu>
</vxml>
```

```
<?xml version="1.0" encoding="UTF-8"?>
<speak version="1.0"
    xmlns="http://www.w3.org/2001/10/synthesis"
    xmlns:xsi="http://www.w3.org/2001/XMLSchema-instance"
    xsi:schemaLocation="http://www.w3.org/2001/10/synthesis ../schema/resources/synthesis.xsd"
    xml:lang="en-US">
        <p>
702B        <s>Alessandro Baricco: "City"</s>
        </p>
        <p>
            <s>
                I like this book as its story involves several strands which are
702D            interwoven in an interesting way, thereby teaching a lot about
                boxing and football :)
            </s>
        </p>
        <p>
            <s>
                Other books by this author
702C            <emphasis>Novacento</emphasis>
                <emphasis>Oceano mare</emphasis>
            </s>
        </p>
        <p>
            <s>
702A            <emphasis>Next book</emphasis>
                <emphasis>Previous book</emphasis>
            </s>
        </p>
</speak>
```

```
<?xml version="1.0" encoding="UTF-8"?>
<html>
  <head>
  </head>
  <body>
    <table border="1">
      <tbody>
        <tr> 404
          <td>
            <div id="A">
              <div><a href="city-page2.html">Next page</a></div> 1203
  1202A       <div><a href="next.d3ml">Next book</a></div>
              <div><a href="previous.d3ml">Previous book</a></div>
            </div>
          </td>
        </tr>
        <tr> 406
          <td>
            <table border="1">
              <tbody>
                <tr>
                  <td> 408
                    <div id="E">
  402E                <div><a href="search.d3ml">Search</a></div>
                      <div><a href="logout.d3ml">Logout</a></div>
                    </div>
                  </td>
                  <td> 410
                    <div id="B">
  402B                <div>Alessandro Baricco: "City"</div>
                    </div>
                  </td>
                </tr>
              </tbody>
            </table>
          </td>
        </tr>
      </tbody>
    </table>
  </body>
</html>
```

```
<?xml version="1.0" encoding ="UTF-8"?>
<!DOCTYPE vxml PUBLIC "-//W3C//DTD VOICEXML 2.0//EN" "http://www.w3.org/TR/voicexml20/vxml.dtd">
<vxml version="2.0" xmlns="http://www.w3.org/2001/vxml">
       <form id="B">
          <block>
             <prompt>
 602B          <p><s>Alessandro Baricco: "City"</s></p>
             </prompt>
          </block>
       </form>
       <menu id="A">
          <prompt>
             Please say one of
             <enumerate />
1402A     </prompt>
          <choice next="city-page2.vxml">Next page</choice>   1403
          <choice next="next.d3ml">Next book</choice>
          <choice next="previous.d3ml">Previous book</choice>
       </menu>
</vxml>
```

```
<?xml version="1.0" encoding="UTF-8"?>
<speak version="1.0"
     xmlns="http://www.w3.org/2001/10/synthesis"
     xmlns:xsi="http://www.w3.org/2001/XMLSchema-instance"
     xsi:schemaLocation="http://www.w3.org/2001/10/synthesis ../schema/resources/synthesis.xsd"
     xml:lang="en-US">
702B      <p>
             <s>Alessandro Baricco: "City"</s>
          </p>
1502A     <p>
             <s>
               <emphasis>Next page</emphasis>      <- 1503
                 <emphasis>Next book</emphasis>
                 <emphasis>Previous book</emphasis>
             </s>
          </p>
</speak>
```

```
<?xml version="1.0" encoding="UTF-8"?>
<html>
    <head>
    </head>
    <body>
        <table border="1">
            <tbody>
                <tr>  ← 404
                    <td>
                        <div id="A">                                                              ⎫
                            <div><a href="city-page1.html">Previous Page</a></div>  ← 1603         ⎪
                            <div><a href="next.d3ml">Next book</a></div>                           ⎬ 1602A
                            <div><a href="previous.d3ml">Previous book</a></div>                   ⎪
                        </div>                                                                     ⎭
                    </td>
                </tr>
                <tr>  ← 406
                    <td>
                        <table border="1">
                            <tbody>
                                <tr>
                                    <td>  ← 408
                                        <div id="E">                                               ⎫
                                            <div><a href="search.d3ml">Search</a></div>            ⎬ 402E
                                            <div><a href="logout.d3ml">Logout</a></div>            ⎪
                                        </div>                                                     ⎭
                                    </td>
                                    <td>  ← 410
                                        <div id="C">                                               ⎫
                                            <div>                                                  ⎪
                                                Other books by this author                         ⎪
                                                <ul>                                               ⎪
                                                    <li><a href="novacento.d3ml">Novacento</a></li>  ⎬ 402C
                                                    <li><a href="oceanomare.d3ml">Oceano Mare</a></li>
                                                </ul>                                              ⎪
                                            </div>                                                 ⎪
                                        </div>                                                     ⎭
                                        <div id="D">                                               ⎫
                                            <div>                                                  ⎪
                                                I like this book as its story involves several strands which are
                                                interwoven in an interesting way, thereby teaching a lot about   ⎬ 402D
                                                boxing and football :)                             ⎪
                                            </div>                                                 ⎪
                                        </div>                                                     ⎭
                                    </td>
                                </tr>
                            </tbody>
                        </table>
                    </td>
                </tr>
            </tbody>
        </table>
    </body>
</html>
```

```
<?xml version="1.0" encoding ="UTF-8"?>
<!DOCTYPE vxml PUBLIC "-//W3C//DTD VOICEXML 2.0//EN" "http://www.w3.org/TR/voicexml20/vxml.dtd">
<vxml version="2.0" xmlns="http://www.w3.org/2001/vxml">
        <form id="D">
           <block>
              <prompt>
                 <p>
                    <s>
                       I like this book as its story involves several
602D                   strands which are interwoven in an interesting
                       way, thereby teaching a lot about boxing and
                       football :)
                    </s>
                 </p>
              </prompt>
           </block>
        </form>
        <form id="C">
           <link next="novacento.d3ml">
              <grammar mode="voice">
                 <rule id="novacento">Novacento</rule>
              </grammar>
           </link>
           <link next="oceanomare.d3ml">
              <grammar mode="voice">
                 <rule id="oceanomare">Oceano Mare</rule>
              </grammar>
           </link>
602C       <block>
              <prompt bargein="true" bargeintype="hotword">
                 <p>
                    <s>
                       Other books by this author
                       <emphasis>Novacento</emphasis>
                       <emphasis>Oceano Mare</emphasis>
                    </s>
                 </p>
              </prompt>
           </block>
        </form>
        <menu id="A">
           <prompt>
              Please say one of
              <enumerate />
1802A      </prompt>
           <choice next="city-page1.vxml">Previous page</choice>   <- 1803
           <choice next="next.d3ml">Next book</choice>
           <choice next="previous.d3ml">Previous book</choice>
        </menu>
</vxml>
```

```
<?xml version="1.0" encoding="UTF-8"?>
<speak version="1.0"
     xmlns="http://www.w3.org/2001/10/synthesis"
     xmlns:xsi="http://www.w3.org/2001/XMLSchema-instance"
     xsi:schemaLocation="http://www.w3.org/2001/10/synthesis ../schema/resources/synthesis.xsd"
     xml:lang="en-US">
        <p>
            <s>
                I like this book as its story involves several strands which are
702D            interwoven in an interesting way, thereby teaching a lot about
                boxing and football :)
            </s>
        </p>
        <p>
            <s>
                Other books by this author
702C            <emphasis>Novacento</emphasis>
                <emphasis>Oceano Mare</emphasis>
            </s>
        </p>
        <p>
            <s>
                <emphasis>Previous page</emphasis>  <- 1903
1902A           <emphasis>Next book</emphasis>
                <emphasis>Previous book</emphasis>
            </s>
        </p>
</speak>
```

FIG. 19

MULTI-MODAL CONTENT PRESENTATION

TECHNICAL FIELD

This disclosure relates in part to multi-modal content presentation.

BACKGROUND

Content may be provided to a user over a network, such as the Internet, and the content may be presented to the user in one or more of a variety of different modalities. Modalities may include, for example, presenting content in a visual format on a computer screen, or presenting content in an audio format over a pair of speakers. Further, the same content may be presented to a user in multiple modalities concurrently, such as, for example, displaying text on a screen and speaking the text over a pair of speakers. This example of multi-modality output may be achieved, for example, by providing both a Hyper-Text Markup Language (HTML) source document and a Voice Extensible Markup Language (VXML) source document for the content and synchronizing the two documents during presentation to the user. Input may also be received from the user in one or more of multiple modalities.

SUMMARY

One implementation disclosed herein provides a single source document that includes content as well as presentation information to enable presentation of the content concurrently in multiple formats. The single source document is accessed iteratively to generate the multiple formats for different portions of the content. For example, the single source document is accessed to generate both an HTML source document and a VXML source document to present a first portion of the content. Upon presentation of the first portion of the content, the implementation may receive a user input in one of many formats. Subsequently, in response to receiving the user input, the single source document is again accessed, but this time in order to generate both an HTML source document and a VXML source document to present a second portion of the content. Thus, a primary feature of the described implementations is to synchronize paginated output on multiple modalities by using equal identifiers for generic and concrete user interface elements.

In one general aspect a method includes receiving a user input, the user input having been input in a user interface in one of multiple modalities. The method also includes accessing, in response to receiving the user input, a multi-modality content document including content information and presentation information, the presentation information supporting presentation of the content information in each of the multiple modalities. In addition, the method includes accessing, in response to receiving the user input, metadata for the user interface, the metadata indicating that the user interface provides a first modality and a second modality for interfacing with a user. First-modality instructions are generated based on the accessed multi-modality content document and the accessed metadata, the first-modality instructions providing instructions for presenting the content information on the user interface using the first modality. Second-modality instructions are generated based on the accessed multi-modality content document and the accessed metadata, the second-modality instructions providing instructions for presenting the content information on the user interface using the second modality.

Implementations may include one or more of the following features. For example, the content information may include a first content portion and a second content portion. The metadata may include a user interface attribute related to pagination. Generating the first-modality instructions and the second-modality instructions may further include determining a particular first-modality pagination describing pagination between the first content portion and the second content portion during presentation on the user interface using the first modality. Generating the first-modality instructions and the second-modality instructions also may include determining a particular second-modality pagination describing pagination between the first content portion and the second content portion during presentation on the user interface using the second modality, wherein the particular first-modality pagination and the particular second-modality pagination are determined based on (i) desired order of presentation of the first content portion and the second content portion in the first modality on the user interface, (ii) desired order of presentation of the first content portion and the second content portion in the second modality on the user interface, and (iii) the user interface attribute related to pagination. Generating the first-modality instructions and the second-modality instructions may further include generating, based on the particular first-modality pagination, the first-modality instructions including instructions for (i) presenting the first content portion on the user interface during a first time interval, and (ii) presenting the second content portion on the user interface during a second time interval; and generating, based on the particular second-modality pagination, the second-modality instructions including instructions for (i) presenting the first content portion on the user interface during the first time interval, and (ii) presenting the second content portion on the user interface during the second time interval.

As part of the method, pagination may be further based on other metadata. Additionally, the user interface attribute may include a screen size indicator.

Generating the first-modality instructions and the second-modality instructions may further include determining multiple first-modality paginations, including the particular first-modality pagination, describing pagination between the first content portion and the second content portion during presentation on the user interface using the first modality. Generating the first-modality instructions and the second-modality instructions also may include determining multiple second-modality paginations, including the particular second-modality pagination, describing pagination between the first content portion and the second content portion during presentation on the user interface using the second modality, wherein each of the multiple first-modality paginations and second-modality paginations are determined based on (i) desired order of presentation of the first content portion and the second content portion in the first modality on the user interface, (ii) desired order of presentation of the first content portion and the second content portion in the second modality on the user interface, and (iii) the user interface attribute related to pagination.

A first pagination scenario may be formed, the forming including associating with a first of the multiple first-modality paginations a first of the multiple second-modality paginations;

Generating the first-modality instructions and the second-modality instructions also may include determining for the first pagination scenario a first distance characterizing whether (i) the first content portion is configured to be presented on the user interface during a first common time interval using both the first modality and the second modality and (ii) the second content portion is configured to be presented on the user interface during a second common time interval using both the first modality and the second modality.

A second pagination scenario may be formed, the forming including associating with a second of the multiple first-modality paginations a second of the multiple second-modality paginations.

Generating the first-modality instructions and the second-modality instructions also may include determining for the second pagination scenario a second distance characterizing whether (i) the first content portion is configured to be presented on the user interface during a first common time interval using both the first modality and the second modality and (ii) the second content portion is configured to be presented on the user interface during a second common time interval using both the first modality and the second modality.

The first distance and the second distance may be compared and a pagination scenario may be selected from the first pagination scenario and the second pagination scenario based on a result of the comparison.

As part of generating the first-modality instructions and the second-modality instructions, the content information may be divided into multiple elements, the first content portion may include at least a first of the multiple elements, the second content portion may include at least a second of the multiple elements, and the first pagination scenario may dictate when elements of the first content portion and elements of the second content portion are presented. Determining the first distance may further include determining, for the first pagination scenario, a number of element-inserts and a number of element-removals that are required in order that (i) the first content portion is configured to be presented on the user interface during a first common time interval using both the first modality and the second modality and (ii) the second content portion is configured to be presented on the user interface during a second common time interval using both the first modality and the second modality. The first distance may be based on the number of element-inserts and the number of element-removals.

The method step of selecting a pagination scenario from the first pagination scenario and the second pagination scenario based on a result of the comparing may further include selecting the pagination scenario based on the minimal pagination distance. The method may further include providing both the first-modality instructions and the second-modality instructions to the user interface.

The presentation information of the multi-modality content document may include (i) a first layout container including presentation information for presenting content using the first modality, and (ii) a second layout container including presentation information for presenting content using the second modality.

The presentation information of the multi-modality content document may include a generic layout container including presentation information for presenting content using multiple modalities.

Generating the first-modality instructions may include a browser generating the first-modality instructions for execution by a processor that controls the user interface.

Generating the first-modality instructions may include generating a first-modality content document that includes the first-modality instructions. Additionally, generating the first-modality content document may further include generating one or more of a Speech Recognition Grammar Specification (SRGS) document, a Hypertext Markup Language (HTML) document, a Voice Extensible Markup Language (VXML) document, or a Speech Synthesis Markup Language (SSML) document.

The metadata for the user interface may further indicate one or more of (i) content types supported by the user interface or (ii) scalability of graphics on the user interface.

In another general aspect, an apparatus includes means for receiving a user input, the user input having been input in a user interface in one of multiple modalities. The apparatus also includes means for accessing, in response to receiving the user input, a multi-modality content document including content information and presentation information, the presentation information supporting presentation of the content information in each of the multiple modalities. The apparatus also includes means for accessing, in response to receiving the user input, metadata for the user interface, the metadata indicating that the user interface provides a first modality and a second modality for interfacing with a user; means for generating first-modality instructions based on the accessed multi-modality content document and the accessed metadata, the first-modality instructions providing instructions for presenting the content information on the user interface using the first modality; and means for generating second-modality instructions based on the accessed multi-modality content document and the accessed metadata, the second-modality instructions providing instructions for presenting the content information on the user interface using the second modality. As part of the apparatus, the means for generating the first-modality instructions may be disposed local to the user interface.

In another general aspect, an apparatus includes a computer-readable medium containing instructions for performing executable operations including receiving a user input, the user input having been input in a user interface in one of multiple modalities. The operations further include accessing, in response to receiving the user input, a multi-modality content document including content information and presentation information, the presentation information supporting presentation of the content information in each of the multiple modalities; and accessing, in response to receiving the user input, metadata for the user interface, the metadata indicating that the user interface provides a first modality and a second modality for interfacing with a user. The operations also include generating first-modality instructions based on the accessed multi-modality content document and the accessed metadata, the first-modality instructions providing instructions for presenting the content information on the user interface using the first modality; and generating second-modality instructions based on the accessed multi-modality content document and the accessed metadata, the second-modality instructions providing instructions for presenting the content information on the user interface using the second modality. In one implementation, the apparatus includes one or more of a portable storage device or a processing device.

The various aspects, implementations, and features may be implemented in one or more of a variety of manners, even if described above using only one manner. For example, the various aspects, implementations, and features may be implemented using, for example, one or more of a method, an apparatus, an apparatus or tool or processing device for performing a method, a program or other set of instructions, an apparatus that includes a program or a set of instructions, and a computer readable medium. The computer readable medium may include, for example, instructions, software, images, and other data.

The details of one or more implementations are set forth in the accompanying drawings and the description below. Other features will be apparent from the description and drawings, and from the claims.

DESCRIPTION OF DRAWINGS

FIG. 3A is an example of a first portion of a source multi-modality content document, the first portion including presentation information.

FIG. 3B is an example of a second portion of the source multi-modality content document referred to in FIG. 3A, the second portion including content information.

FIG. 4 is an example of a set of instructions for presenting the multi-modality content information of FIG. 3B using a visual modality of a user interface, in accordance with the presentation information of FIG. 3A.

FIG. 6 is an example of a set of instructions for presenting the multi-modality content information of FIG. 3B using a voice input/output modality of a user interface, in accordance with the presentation information of FIG. 3A.

FIG. 7 is an example of a set of instructions for presenting the multi-modality content information of FIG. 3B using a voice output modality of a user interface, in accordance with the presentation information of FIG. 3A.

FIG. 12 is an example of a set of instructions for presenting a first paginated portion of the multi-modality content of FIG. 8 using a visual modality of a user interface.

FIG. 14 is an example of a set of instructions for presenting a first paginated portion of the multi-modality content of FIG. 8 using a voice input/output modality of a user interface.

FIG. 15 is an example of a set of instructions for presenting a first paginated portion of the multi-modality content of FIG. 8 using a voice output modality of a user interface.

FIG. 16 is an example of a set of instructions for presenting a second paginated portion of the multi-modality content of FIG. 8 using a visual modality of a user interface.

FIG. 18 is an example of a set of instructions for presenting a second paginated portion of the multi-modality content of FIG. 8 using a voice input/output modality of a user interface.

FIG. 19 is an example of a set of instructions for presenting a second paginated portion of the multi-modality content of FIG. 8 using a voice output modality of a user interface.

DETAILED DESCRIPTION

An implementation provides a single source document that includes a content section, and a container section for each modality that is supported. The containers provide the presentation information that enables the implementation to generate modality-specific source documents for each portion of content that is to be presented at a given point in time.

Figure 1:
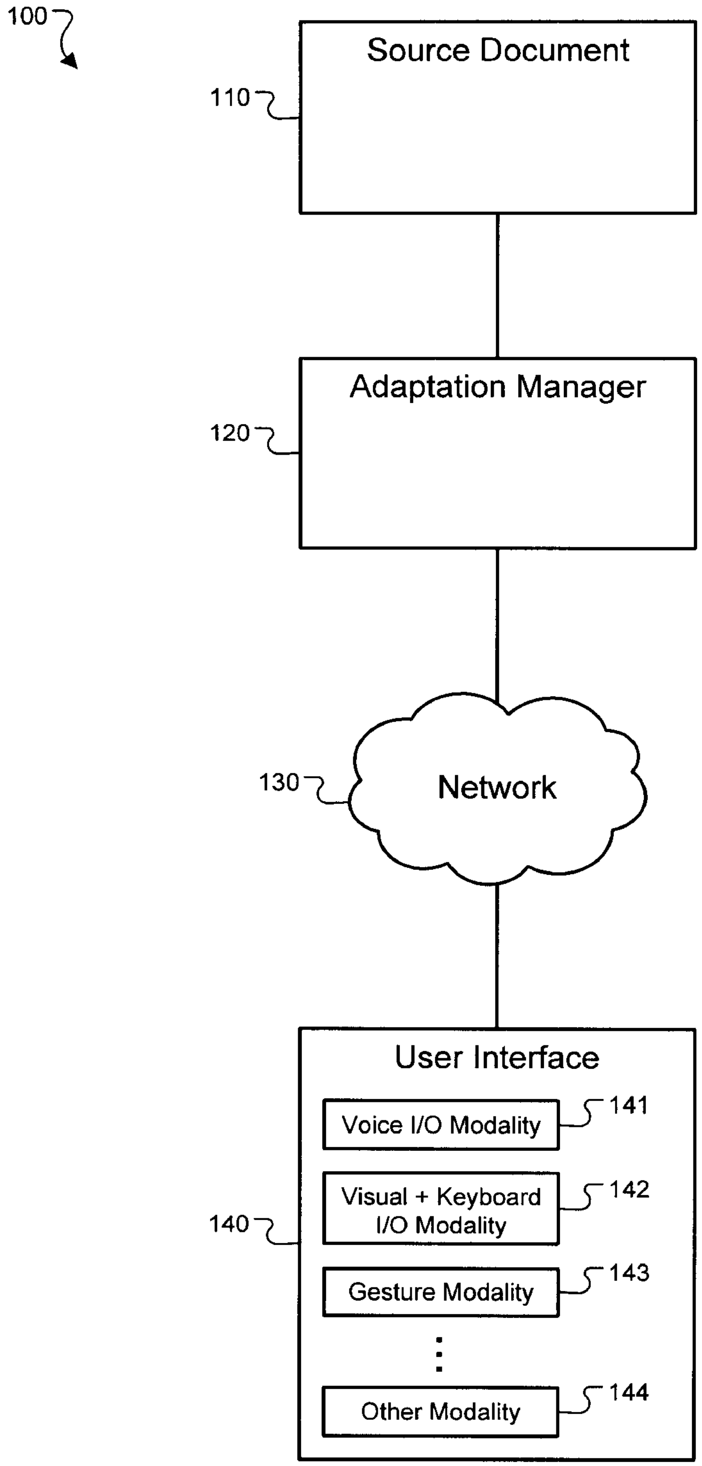
FIG. 1 is a block diagram of an example of a system for presenting multi-modality content within a user interface.

FIG. 1 shows an example of a system 100 for presenting multi-modality content on a user interface. Other systems are possible, and several but not all, are mentioned throughout this disclosure, for example, in the discussion of FIG. 1 or toward the end of this disclosure. The system 100 includes a source document 110, an adaptation manager 120, a network 130, and a user interface 140. The source document 110 is coupled to the adaptation manager 120, the adaptation manager 120 is coupled to the network 130, and the network 130 is coupled to the user interface 140. Further, the user interface 140 includes multiple modalities capable of presenting content to the user and receiving inputs from the user. For example, the user interface 140 may include a voice input/output (I/O) modality 141, a visual I/O modality 142, a gesture input modality 143, and other input and/or output modalities 144. In some implementations, the visual I/O modality 142 may include input devices, such as, a keyboard or pointing device. In addition, the voice I/O modality 141 may include text-to-speech processing and voice recognition processing.

The source document 110 is a multi-modality content document including content and presentation information. Particularly, the source document 110 includes content information that may be presented on a user interface in a variety of ways, such as a visual display or an audible sound. The presentation information within the source document 110 describes how the content information is presented on one or more presentation modalities. In some implementations, the particular modality of the presentation may not be known at the time the source document 110 is created, and the source document 110 may include generic presentation information that can be applied to multiple modalities that may be known or unknown. The source document 110 may also describe how a user may interact with the presented content.

The adaptation manager 120 is capable of accessing the source document 110. The adaptation manager 120 adapts the content information in the source document 110 for presentation on the user interface 140 using the presentation information in the source document 110. In addition, the adaptation manager 120 accesses metadata for the user interface 140. The metadata may describe properties of the user interface 140, such as its methods of output or modalities (e.g., the visual I/O modality 142 and the voice I/O modality 141), its display capabilities (e.g., resolution, color depth, width, and height), and its input methods (e.g., a keyboard and a pointing device within the visual I/O modality 142, the gesture modality 143, and the voice I/O modality 141). The adaptation manager 120 uses the source document 110 and the metadata to produce a set of instructions for presenting the content information on a particular modality of the user interface 140. For example, the adaptation manager 120 may produce sets of instructions for presenting the source document 110 using the visual I/O modality 142 and the voice I/O modality 141.

In one implementation, the sets of instructions are provided to the user interface (e.g., a browser) 140 via the network 130, which may be, for example, a local area network or the Internet. In another implementation, the sets of instructions are provided to a processor coupled to the user interface 140, such as may occur, for example, if a browser performs the role of the adaptation manager 120 and produces the sets of instructions, and provides the sets to a processor for execution. In some implementations, the source document 110 and the adaptation manager 120 may be separated by a network, such as a local area network or the Internet.

In another example system, a web browser may perform the adaptation of the source document 110 locally at the user interface 140 and provide the sets of instructions to the available modality processing components 141-144 of the user interface 140.

In general, the user interface 140 includes at least two modalities, such as, for example, the visual I/O modality 142 and the voice I/O modality 141. For example, in an environment where a user's hands and visual focus are busy with a task other than operating a user interface, the user interface may include input and output modalities that make use of other input and output methods available to the user, such as text-to-speech output, voice recognition input, and the gesture recognition input 143. During some periods, such as periods of high background noise, the user may revert to a visual and/or tactile interface. The sets of instructions for the modalities may allow the user interface to present the content synchronously in the visual and voice interfaces, such that portions of the voice information that correspond to portions of the visual information may be presented at a same or similar period in time.

For example, workers in an aircraft maintenance facility may use the system 100 described above. The user interface 140 may present information to a worker regarding an aircraft maintenance task performed by the worker. The worker may frequently use both hands while performing the aircraft maintenance task and the worker may be focused visually on the aircraft maintenance task. This may prevent the worker from seeing the user interface 140 or from using his or her hands to interact with the user interface 140. The adaptation manager 120 may adapt the source document 110 for presentation in a voice modality of the user interface 140 in addition to a visual modality. The user interface 140 may also accept voice inputs from the worker, for example, to navigate within the adapted source document, in addition to keyboard or pointing device inputs. When background noise, such as the noise generated by the operation of a jet engine, interferes with the use of the voice I/O modality 141, the worker may use another modality, such as the visual I/O modality 142 and the keyboard or pointing device input or the gesture input modality 143. The worker may switch between the different input and output modalities due to the synchronization of the portions of the source document 110 presented in the modalities. For example, as the worker switches from the voice input modality 141 to the visual input modality 142, audible information presented using the voice output modality should correspond to information concurrently presented using the visual output modality.

Figure 2:
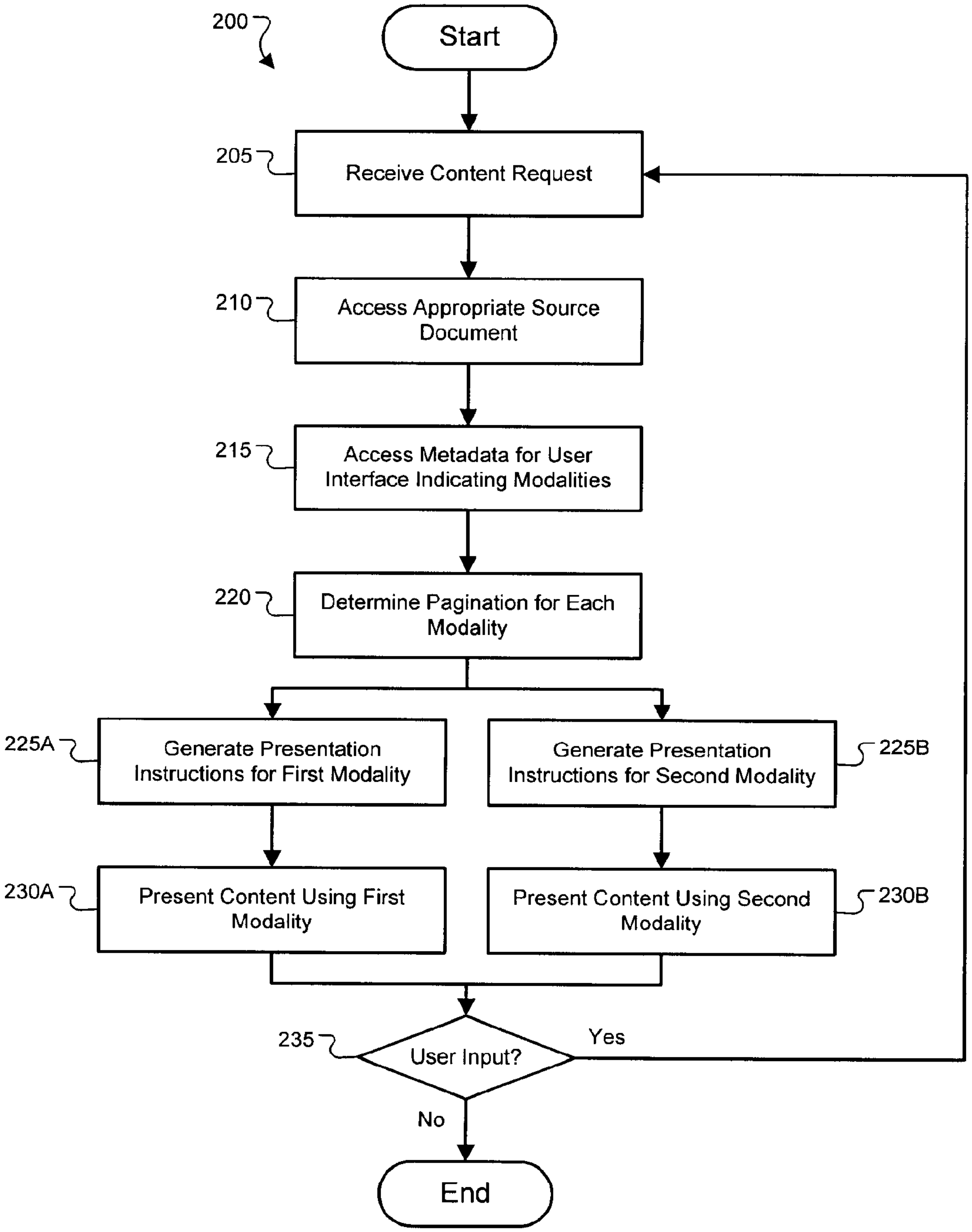
FIG. 2 is a flow chart of an example of a method of operations that may be performed to present multi-modality content to a user.

FIG. 2 shows a process 200 for presenting multi-modality content within a user interface. The process 200 may be performed, for example, in the context of a system such as system 100 and, for clarity of presentation, the description that follows uses system 100 as the basis of an example for describing the process 200. However, another system, or combination of systems, may be used to perform the process 200.

The process 200 includes receiving a content request (205). For example, the adaptation manager 120 may receive the content request from the user interface 140 via the network 130. The content request may be the result of a user input made within the user interface 140 that requests the presentation of a document that includes multi-modality content. In some implementations, the user interface 140 is a web browser and the document is a web page provided to the user interface 140 via the Hypertext Transport Protocol (HTTP). The content request may be the result of the user selecting a hyperlink within a web page that requests the presentation of the document within the user interface 140.

The process 200 includes accessing an appropriate source document (210). For example, the adaptation manager 120 may access the source document 110. The source document 110 includes content information to be presented to the user and presentation information describing how to present the content information using the modalities of the user interface 140. In some implementations, the multi-modality content and presentation information within the source document 110 is in a common format, such as the Extensible Hypertext Markup Language (XHTML) format.

The process 200 includes accessing metadata for the user interface that indicates modalities of the user interface (215). For example, the user interface 140 includes multiple presentation and interaction modalities, such as the visual I/O modality 142 (including the keyboard and pointing device inputs), the voice I/O modality 141, and the gesture recognition modality 143. The metadata describes the modalities that are available within the user interface 140. The adaptation manager 120 may receive the metadata from the user interface 140, such as in the case of CC/PP (W3C Composite Capabilities and Preference Profile) information that describes attributes of a web browser. In another example, the adaptation manager 120 may retrieve the metadata from a repository using an identifier of the user interface 140 that is associated with the metadata.

The process 200 includes determining a pagination of the content to be presented within each modality of the user interface (220). Pagination refers to dividing the content into multiple portions that may be viewed during different time intervals. In some implementations, the smaller portions are capable of being displayed using an output modality, such as a display device of the visual I/O modality 142. In addition, the smaller portions may be easier for a user to comprehend when presented using the voice I/O modality 141, given the average short-term memory of a user. In some implementations, the portions may be divided based on metadata, such as the available display size of a visual modality of the user interface. For example, the presentation information in the source document 110 may divide the content information into multiple portions. The presentation information may also specify for each portion whether the adaptation manager 120 may paginate the portion. In one implementation, the portions of the content information that are not paginated will appear within each paginated page, while the portions that are paginated may be split among multiple paginated pages. The adaptation manager 120 may use the metadata describing, for example, the available display size of the visual modality and the allowed paginations of the content portions to determine the pagination of the source document 110.

In one example, the source document 110 may contain three portions, including a first portion that may not be paginated together with second and third portions that may be paginated. The first portion may be a menu of hyperlinks that are presented to the user at all times during the presentation of the content within the source document 110. The second and third portions may be lists of data that may be presented to the user during separate time intervals. The adaptation manager 120 may paginate the content of the source document 110 in this example into two paginated pages. Both paginated pages include the first portion, as it is not paginated content. The first paginated page may include the second portion and the second paginated page may include the third portion. The decision of the adaptation manager 120 to split the content into two paginated pages may be determined by comparing a calculated size of the content portions to, for example, the size of the available display area within a visual modality. The adaptation manager 120 may determine that all three content portions cannot be displayed within the available area.

The process 200 includes generating presentation instructions for at least a first modality and a second modality (225A and 225B, respectively). The modalities of the user interface use the presentation instructions to present the content information to the user. The presentation instructions for each modality may be generated in parallel as shown in FIG. 2 or serially. Generally, the presentation instructions are in a format that the modality processing components are capable of processing. For example, the adaptation manager 120 may provide a visual modality with HTML instructions and a voice modality with VXML (for combined voice input and output), or Speech Synthesis Markup Language (SSML) instructions for voice output plus Speech Recognition Grammar Specification (SRGS) for voice input. Alternatively, the adaptation manager 120 may provide the user interface 140 or the modalities of the user interface 140 with a single set of presentation instructions that may be processed either by the user interface 140 or the modalities. In another example, the user interface 140 or the modalities of the user interface 140 may perform the adaptation of the source document 110 and the generation of the presentation instructions.

The process 200 includes presenting the content using at least the first modality and the second modality (230A and 230B, respectively). For example, the user interface 140 may present the first portion and the second portion of the source document 110 using the visual modality and the voice modality during the first time interval. The user interface 140 may then present the first portion and the third portion using the visual modality and the voice modality during the second time interval, as previously described above in the pagination example.

If a user input is made (235), then the process 200 may receive the user input as a content request (205). If no user input is made, then the process 200 may terminate, or may wait (not shown) until a user input is made. For example, the new content request may be a request to view a new source document and the process 200 may continue as described above. Alternatively, the content request may be a request to present another page generated from the pagination of the content information in the source document 110.

FIGS. 3A and 3B show an example of information that the source document 110 may contain. The information in this example is defined as device-independent multi-modal markup language (D3ML). Other implementations may use, for example, an extension of the XHTML format, or an adaptation of XML.

FIG. 3A shows a portion of the source document 110 including the presentation information. The presentation information includes a "d3ml:layout-container" element for each modality that describes the presentation of the content information for that modality. Particularly, a container 302 describes the presentation of the content information using a visual modality and a container 304 describes the presentation of the content information using voice modalities. The Content Selection for Device Independence (DISelect) may be used to identify the output modalities indicated in the user interface metadata and to select the containers to apply to the content information. Other DISelect functions may be used to determine other properties of the user interface, such as available input modalities, available navigation modalities, a color depth of a visual modality, a width of the visual modality, a height of the visual modality, and a resolution of the visual modality. Particularly, when the "outputMethod( )" function evaluates to 'visual' (see reference 301) then the container 302 for the visual modality is selected and an HTML page may be generated for the visual modality. When the "outputMethod( )" function evaluates to 'voice' (see reference 303) then the container 304 for the voice modality is selected and a VXML or an SSML page may be generated.

The containers include the presentation information used to present the content information in a particular modality. In addition, the content information may be divided into portions and the containers may reference the portions of the content information using identifiers 306A-E. For example, in the case of the visual modality, the container 302 may include a description of the spatial relationships of the content portions. The visual container 302 includes "d3ml:row" (see 308, 310) and "d3ml:column" (see 312, 314) elements that describe the spatial presentation of the content portions when using the visual modality. A first row 308 of the visual presentation includes the content portion associated with the identifier 306A. A second row 310 of the visual presentation includes a first column 312 containing the content associated with the identifier 306E and a second column 314 containing the content portions associated with the identifiers 306B-D. In the case of the voice modality, the container 304 may include a description of the sequence in which the portions are presented using the voice modality. The order that portions occur within the voice container 304 determines the sequence in which the portions are presented when using the voice modality.

FIG. 3B shows a portion of the source document 110 including the content information. The content information in this example is information about a book called "City" and its author, "Alessandro Baricco". The content information is divided into portions 316A-E. Each content portion is contained within a "section" element and has an identifier (id) attribute matching one of the identifiers 306A-E. The portion 316A includes a navigation menu of links to a next book and a previous book. The portion 316B includes the name of the author and the title of the book. The portion 316C includes a list of links to other books written by the author. The portion 316D includes a review of the book and the portion 316E includes a menu of other options.

Referring again to FIG. 3A, the visual container 302 presents the navigation menu portion 316A in the row 308 at the top of the visual modality (see 306A), the other options portion 316E in the first column 312 of the second row 310 (see 306E), and the portions 316B-D in the second column 314 of the second row 310 (see 306 B-D). The voice container 304 organizes the content in a manner appropriate to a voice modality. The voice container 304 presents the portions 316B-D first and the navigation menu portion 316A last in order to allow the user to listen to the data being presented before deciding whether to navigate to other content. The other options portion 316E may be unnecessary and is not included in the voice modality presentation.

Figure 5:
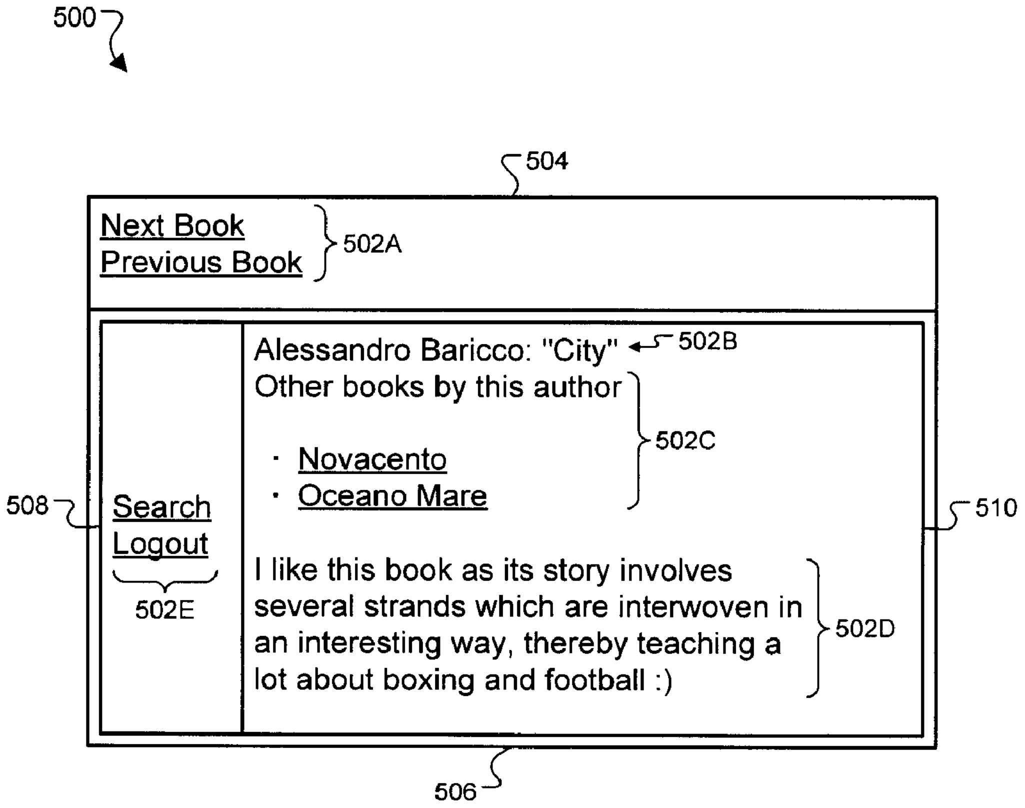
FIG. 5 is an example of a presentation of the multi-modality content using the visual modality of the user interface based on the instructions of FIG. 4.

FIGS. 4-7 illustrate examples of how instructions in various modalities may be generated from the source document 110 (see FIGS. 4, 6, and 7), as well as how one of those modalities may be rendered (see FIG. 5). These examples are illustrated with specificity for clarity in presentation. Accordingly, these examples are illustrative and not exhaustive. For example, the source document 110 may be used to generate instructions in other modalities, and may be used to generate sets of instructions in the illustrated modalities that are different from the set of instructions shown in FIGS, 4, 6, and 7.

FIG. 4 shows an example of a set of HTML instructions 400 generated based on the source document 110 of FIGS. 3A and 3B. The adaptation manager 120 may generate the instructions 400 for presentation using a visual modality of the user interface 140. The adaptation manager 120 uses the visual container 302 together with the content portions 316A-E to generate the instructions 400. The instructions 400 include HTML elements 402A-E that correspond to the content portions 316A-E. To generate the instructions 400, the adaptation manager 120 performs various actions, including replacing the "section" tag names of the source document 110 with the HTML "div" tag name and placing the contents of the "div" tags within a tabular structure as described by the "d3ml:row" and "d3ml:column" tags. Here, a "tr" tag 404 corresponds to the first row 308, a "tr" tag 406 corresponds to the second row 310, a "td" tag" 408 corresponds to the first column 312 of the second row 310, and a "td" tag 410 corresponds to the second column 314 of the second row 310.

FIG. 5 shows an example of a presentation 500 of the HTML instructions 400 by a visual modality of the user interface 140. The HTML element 402A corresponding to the navigation menu content portion 316A is presented as a display element 502A in a first row 504. The HTML element 402E corresponding to the other options portion 316E is presented as a display element 502E in a first column 508 of a second row 506. The HTML elements 402B-D corresponding to the author/title, the other books, and the review, respectively, are presented as display elements 502B-D, respectively, in a second column 510 of the second row 506.

FIG. 6 shows an example of a set of VXML instructions 600 generated based on the source document 110 of FIGS. 3A and 3B. The adaptation manager 120 may generate the instructions 600 for presentation using a voice modality of the user interface 140. The adaptation manager 120 uses the voice container 304 together with the content portions 316A-D to generate the instructions 600. The instructions 600 include VXML elements 602A-D that correspond to the content portions 316A-D. To generate the instructions 600, the adaptation manager 120 replaces the "section" tag names of the source document 110 with corresponding VXML tags, among other actions. For example, the content portion 316A containing only hyperlinks is replaced by the VXML "menu" tag 602A. The "menu" tag 602A includes VXML "choice" tags for each of the hyperlinks in the content portion 316A. The "menu" and "choice" tags present a list of options to the user and allow the user to make a selection verbally. The other content portions 316B-D are replaced by the VXML "form" tags 602B-D. The "form" tags present content to the user audibly. The "form" tags may also accept verbal input from the user via the "link" tag, as shown in the "form" tag 602C, where the user may verbally select another book to navigate to. The content portions 316A-D are presented to the user by the VXML instructions 600 in the order that the "d3ml:content-ref" tags are specified in the voice container 304. Here, the author/title content portion 316B is presented first, the review content portion 316D is presented second, the list of other books content portion 316C is presented third, and the navigation content portion 316A is presented last.

While the sequence in which the voice content is presented may not be the same as the instructions 400 for the visual modality, they generally present the same content. For example, the navigation content portion 316A appears first in the visual modality and last in the voice modality. In some implementations, a content portion may not be relevant in a particular modality, such as the content portion 316E, which is not included in the voice modality presentation.

FIG. 7 shows an example of a set of SSML instructions 700 generated based on the source document 110 of FIGS.3A and 3B. The adaptation manager 120 may generate the instructions 700 for presentation using a voice modality of the user interface 140. In some implementations, SSML instructions may be used when the user interface 140 does not provide verbal user input. The adaptation manager 120 uses the voice container 304 together with the content portions 316A-D to generate the instructions 700. The instructions 700 include SSML elements 702A-D that correspond to the content portions 316A-D. To generate the instructions 700, the adaptation manager 120 replaces the tags (e.g. the D3ML tags) of the source document 110 with corresponding SSML tags, among other actions. For example, the "section" tags are replaced with "p" tags, the "div" tags are replaced with "s" tags, and the hyperlinks in the content portions are replaced with "emphasis" tags. The content portions 316A-D are presented to the user by the SSML instructions 700 in the order that the "d3ml:content-ref" tags are specified in the voice container 304. Here, the author/title content portion 316B is presented first, the review content portion 316D is presented second, the list of other books content portion 316C is presented third, and the navigation content portion 316A is presented last.

Figure 8:
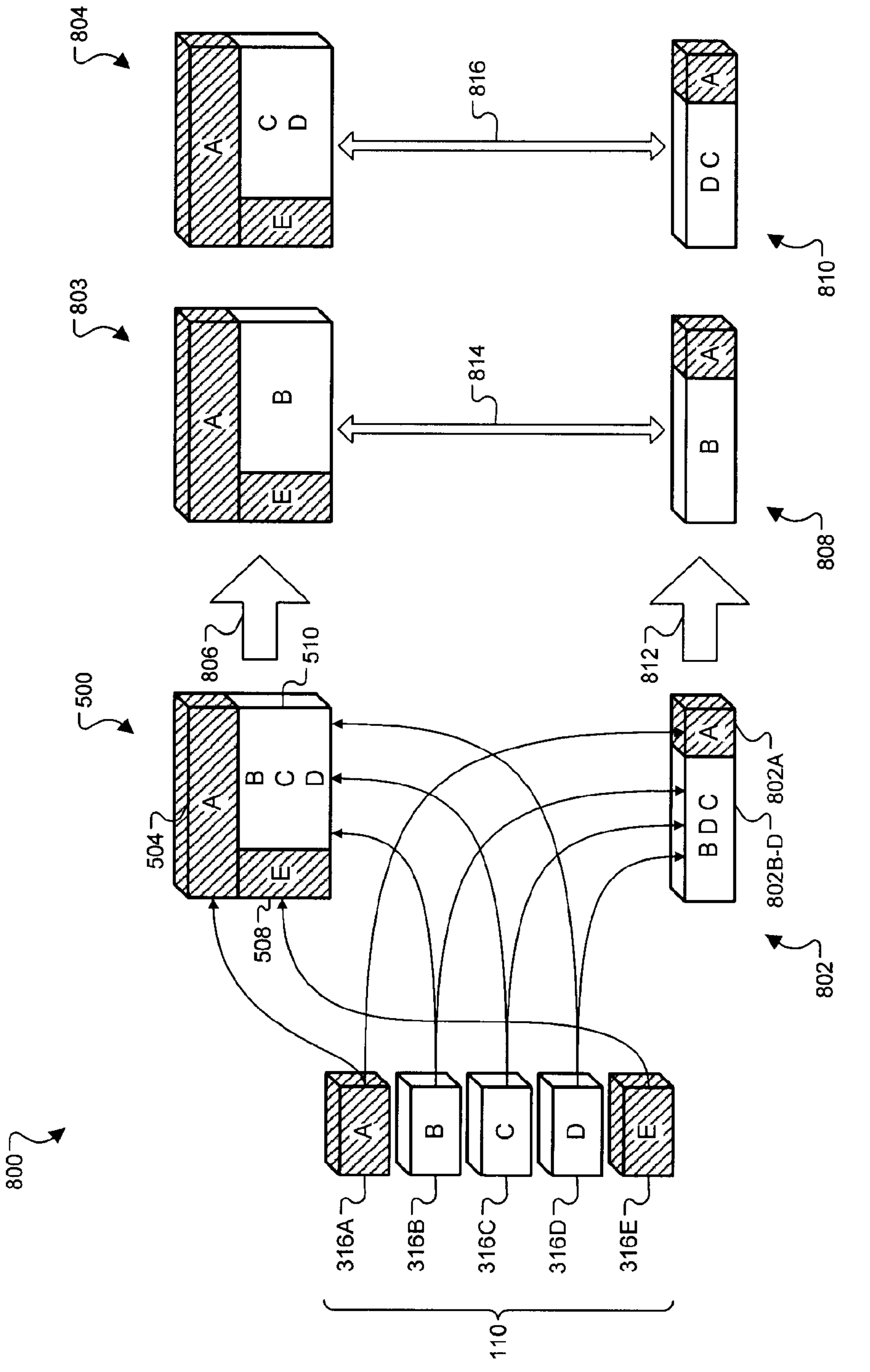
FIG. 8 is an example of a schematic diagram of a first pagination scenario for presenting multi-modality content using visual and voice modalities of a user interface.

FIG. 8 is an example of a schematic diagram of a first pagination scenario 800 for presenting multi-modality content using visual and voice modalities of the user interface 140. The scenario 800 shows how the content portions 316A-E of the source document 110 may be adapted to generate both (1) the HTML instructions 400 and the resulting presentation 500, and (2) the VXML instructions 600 which are shown as producing an audio presentation 802.

Audio presentation 802 is a diagrammatic representation of the output generated from the VXML instructions 600. The audio presentation 802 includes four elements 802A-D. As illustrated, the element 802B is presented first, the element 802D is presented second, the element 802C is presented third, and the element 802A is presented fourth. The elements 802A-D correspond to the renderings produced from the VXML elements 602A-D, respectively.

Alternatively, the audio presentation 802 may also represent output generated from the SSML instructions 700. The presentation 500 and the audio presentation 802 are presented to the user concurrently. This concurrent presentation allows, for example, the user to switch from responding in one modality to responding in another modality as successive pieces of content are presented.

In some implementations, the content portions 316A-E may be divided into separate sets of instructions that are presented during separate time intervals, referred to here as pagination. For example, if the size of the visual modality does not permit all of the content portions 316A-E to be presented at the same time, then the adaptation manager 120 may paginate the instructions 400 and 600 into multiple sets of instructions that are presented during separate time intervals.

In the first pagination scenario 800, the adaptation manager 120 paginates the instructions 400 into two sets of instructions that are rendered as two presentations 803 and 804, as indicated by arrow 806. In addition, the adaptation manager 120 paginates the instructions 600 into two sets of instructions that are rendered as two audio presentations 808 and 810, as indicated by arrow 812. The visual modality presentation 803 and the voice modality audio presentation 808 are presented concurrently during a first time interval, as represented by arrow 814. Similarly, the visual modality instructions 804 and the voice modality audio presentation 810 are presented concurrently during a second time interval, as represented by arrow 816. It should be clear in the example that the pairs of presentations presented during the first and second time intervals (803 and 804 as a first pair, and 808 and 810 as a second pair) also present substantially the same content portions as did each of the presentations 500 and802, respectively.

The presentation information in the source document 110 may contain attributes related to pagination. The attributes specify whether or not a particular set of content portions may be paginated. If a set of content portions is not allowed to be paginated, then the content portions in that set must all be presented together without being divided across multiple pages. If a set of content portions is allowed to be paginated, then content portions in that set may be divided so that each of the content portions in the set are presented in only one of the paginated sets of instructions. For example, the source document 110 includes a set of pagination attributes 820, 822, 824, 826, and 828. The pagination attributes 820, 822, and 828 indicate that pagination is not allowed. However, because each of the pagination attributes governs only a single content portion (the content portions 306A, 306E, and 306A, respectively), no pagination is possible anyway. That is, the example being considered does not allow for an individual content portion to be divided upon presentation. Conversely, the pagination attributes 824 and 826 each govern a set of content portions, which includes the content portions 306B-D, and the pagination attributes 824 and 826 each allow for pagination of the individual content portions in the set.

An alternate way of explaining the pagination attributes is that if a content portion in a set of instructions is not allowed to be paginated (e.g., the content portions 316A and 316E), then that content portion must be presented in the rendering of each page of the set of instructions. However, if a content portion is allowed to be paginated (e.g. the content portions 316B-D), then the content portion may be presented in the rendering of only one of multiple pages of the set of instructions. In the pagination scenario 800 the content portions that are shaded represent content that is not allowed to be paginated as specified in the presentation information. For example, the navigation content portion 316A is not allowed to be paginated in either the visual modality or the voice modality. Accordingly, the content portion 316A is presented in each of the paginated sets of instructions 803, 804, 808, and 810 to allow the user to navigate to a next or previous book regardless of which paginated set of instructions is rendered for the user.

In some implementations, the adaptation manager 120 may use other metadata when paginating the sets of instructions 400 and 600. For example, the pagination may be based on metadata describing the screen size, the scalability of graphics, or supported content types. The adaptation manager 120 may paginate the content portions 316A-E so that each set of instructions may be presented within the screen size of the visual modality. In general, the adaptation manager 120 continues to use the presentation order, layout, and pagination attribute from the presentation information when using other metadata for pagination. If a particular content type is not supported by a modality, the adaptation manager 120 may remove content portions of that type or replace them with alternate content information. If a graphic may not be scaled, for example, below a particular size, then the adaptation manger 120 may increase the size of the graphic and it may reduce the amount of other content presented to provide more presentation area for the graphic. In some implementations, the user interface 140 may provide the metadata to the adaptation manager 120, such as by providing CC/PP information. In addition, the adaptation manager 120 may retrieve the metadata, for example, from a lookup table that stores metadata associated with the user interface 140.

Figure 9:
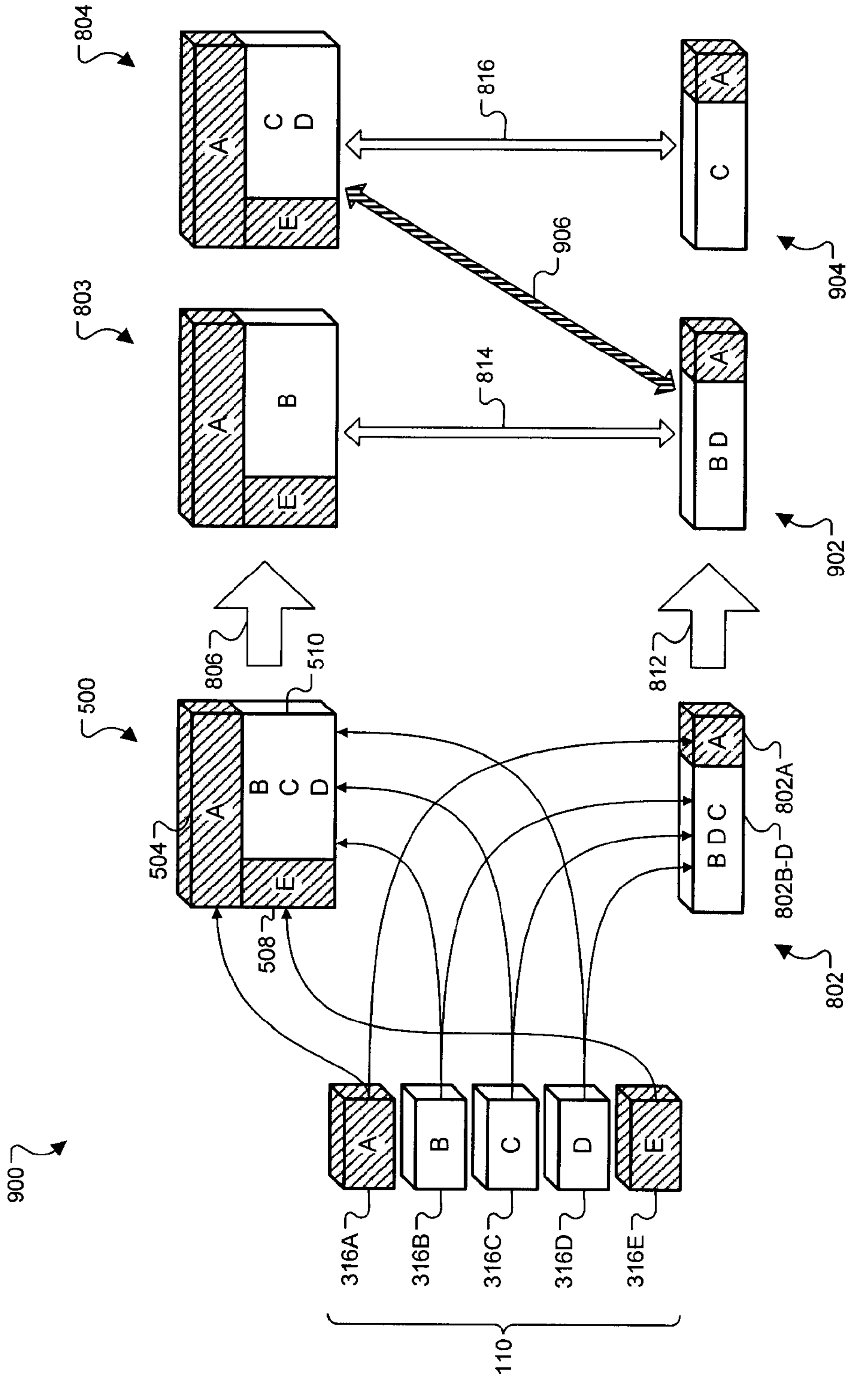
FIG. 9 is an example of a schematic diagram of a second pagination scenario for presenting multi-modality content using visual and voice modalities of a user interface.
Figure 10:
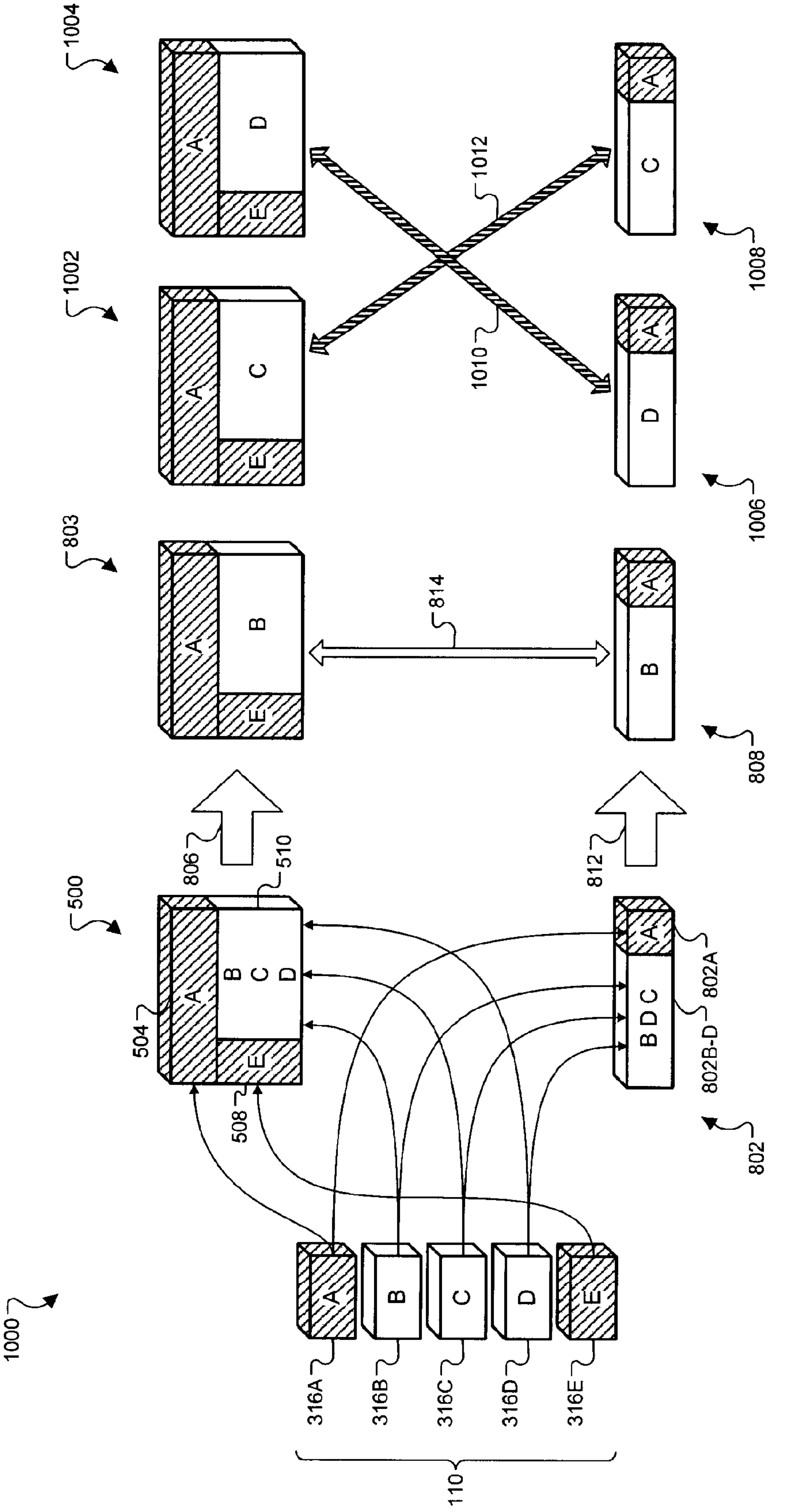
FIG. 10 is an example of a schematic diagram of a third pagination scenario for presenting multi-modality content using visual and voice modalities of a user interface.
Figure 11:
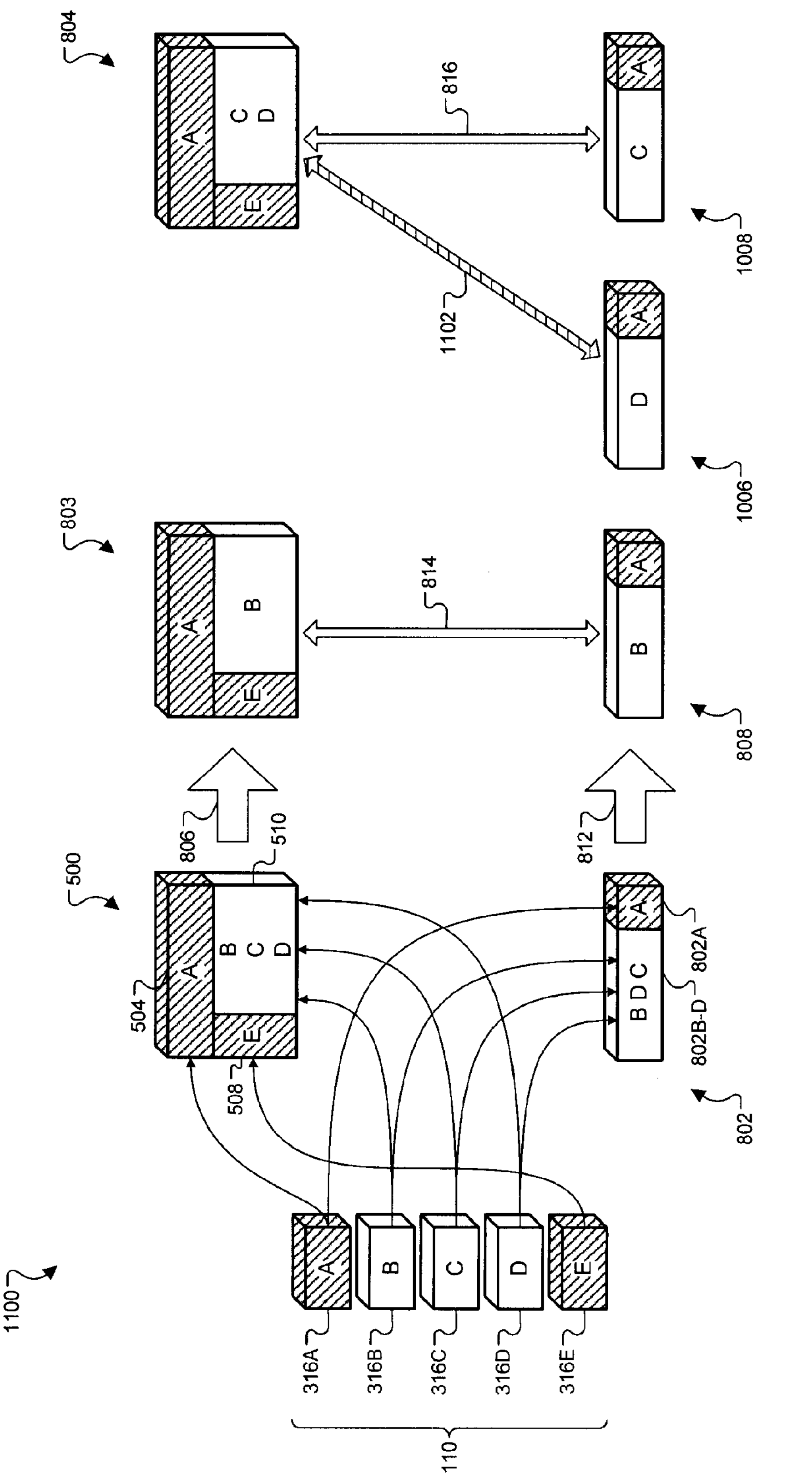
FIG. 11 is an example of a schematic diagram of a fourth pagination scenario for presenting multi-modality content using visual and voice modalities of a user interface.

Before describing the alternative pagination scenarios of FIGS. 9-11, we describe various sets of instructions, and renderings, associated with the first pagination scenario 800. These instructions and renderings are illustrated in FIGS. 12-19.

FIG. 12 is an example of a set of instructions 1202 for rendering the presentation 803, which presents the first paginated portion of the multi-modality content of FIG. 8 using the visual modality of the user interface 140. The instructions 1202 are similar to the instructions 400. However, the instructions1202 do not include the elements 402C-D because the elements 402C-D are not included in this page. In addition, the instructions 1202 include an element 1202A, which includes the navigation content portion 316A as well as instructions 1203 to generate a hyperlink that allows the user to navigate to the next paginated set of instructions 804 (see FIG. 16) that produce the presentation. As described above, the content portions 316A and 316E are included because they are not allowed to be paginated. The content portion 316B is included because of its order of presentation specified in the presentation information.

Figure 13:
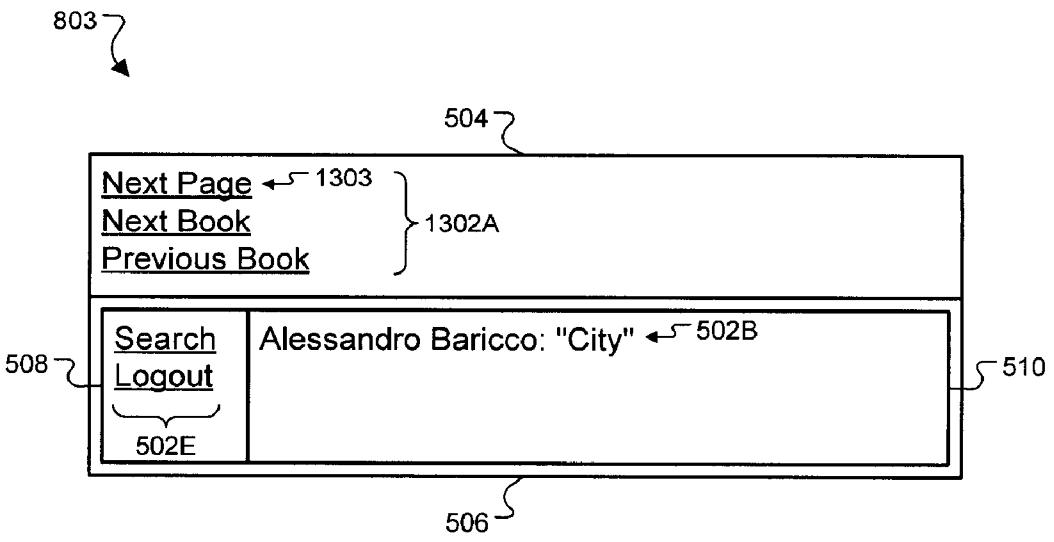
FIG. 13 is an example of a presentation of the first paginated portion of the multi-modality content of FIG. 8 based on the instructions of FIG. 12 using the visual modality of the user interface.

FIG. 13 is an example of the presentation 803 of the first set of instructions 1202. An element 1302A is rendered from the element 1202A, and includes a hyperlink 1303 that allows the user to navigate to the next paginated set of instructions. The element 1202A also includes the navigation content portion 316A. The spatial arrangement of the content portions 316A, 316B, and 316E is as described in the presentation information. The rendering 803 of the first visual set of instructions is presented concurrently with the rendering 808 of the first voice set of instructions.

FIG. 14 is an example of a set of instructions 1408 for rendering the audio presentation 808, which presents the first paginated portion of the multi-modality content of FIG. 8 using the voice input/output modality of the user interface 140. The instructions 1408 are rendered concurrently with the instructions 1202 and are substantially the same in content as the instructions 1202. The instructions 1408 do not present the content portion 316E as it is not necessary for the user to be presented with this content via the voice modality. As in the instructions 1202, the instructions 1408 include an element 1402A that includes instructions 1403 for generating a link that allows the user to navigate to the next paginated set of instructions (see FIG. 18) that produce the presentation 810. The element 1402A also includes the navigation content portion 316A.

FIG. 15 is an example of a set of instructions 1500 for presenting the first paginated portion 808 of the multi-modality content of FIG. 8 using a voice output modality of the user interface 140. In the case where the user interface 140 includes a voice output only modality, the adaptation manager 120 may generate SSML instructions such as the set of instructions 1500. The instructions 1500 are the SSML equivalent of the instructions 1408. The instructions 1500 also include an element 1502A, which includes an instruction

1503 that indicates that there is another paginated set of instructions to which the user may navigate.

FIG. 16 is an example of the set of instructions 1604 for presenting the second paginated portion 804 of the multi-modality content of FIG. 8 using the visual modality of the user interface 140. The instructions 1604 differ from the instructions 400 in that they do not include the content portion 316B. In addition, an element 1602A includes an instruction 1603 for generating a hyperlink that allows the user to navigate to the previous paginated set of instructions 803. The element 1602A also includes the navigation content portion 316A.

Figure 17:
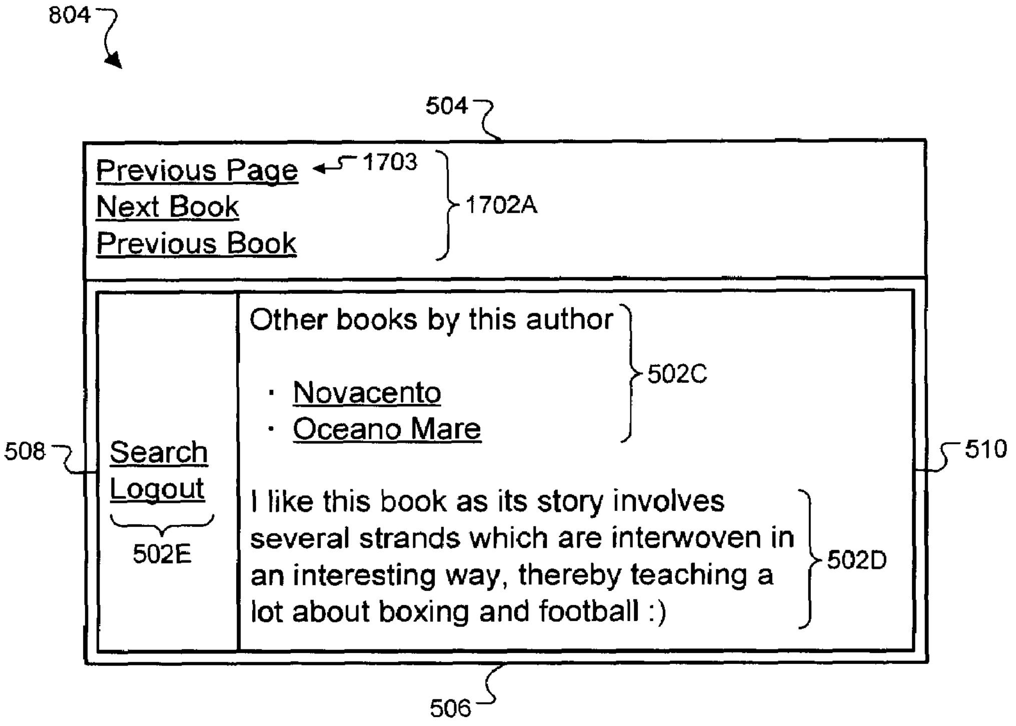
FIG. 17 is an example of a presentation of the second paginated portion of the multi-modality content of FIG. 8 based on the instructions of FIG. 16 using the visual modality of the user interface.

FIG. 17 is an example of the presentation 804 of the set of instructions 1604. An element 1702A is rendered from the element 1602A, and includes a hyperlink 1703 that allows the user to navigate to the previous paginated set of instructions 803. The element 1702A also includes a rendering of the navigation content portion 316A. The spatial arrangement of the content portions 316A, 316C, 316D, and 316E is as described in the presentation information. The second visual set of instructions 1604 is presented concurrently with a second voice set of instructions (see FIG. 18) that generate the audio presentation 810.

FIG. 18 is an example of a set of instructions 1810 for presenting the second paginated portion 810 of the multi-modality content of FIG. 8 using the voice input/output modality of the user interface 140. The instructions 1810 are presented concurrently with the instructions 1604 and are substantially the same in content as the instructions 1604. The instructions 1810 do not present the content portion 316E as it is not necessary for the user to be presented with this content via the voice modality. As in the instructions 1604, the instructions 1810 include an element 1802A that includes an instruction 1803 for generating a link that allows the user to navigate to the previous paginated set of instructions 1408. The element 1802A also includes the navigation content portion 316A.

FIG. 19 is an example of a set of instructions 1900 for presenting the second paginated portion 810 of the multi-modality content of FIG. 8 using a voice output modality of the user interface 140. In the case where the user interface 140 includes a voice output only modality, the adaptation manager 120 may generate SSML instructions such as the set of instructions 1900. The instructions 1900 are the SSML equivalent of the instructions 1810. The instructions 1900 also include an element 1902A that includes an instruction 1903 indicating that there is another paginated set of instructions to which the user may navigate.

Returning now to the discussion of pagination scenarios, we address FIG. 9 which shows an example of a schematic diagram of a second pagination scenario 900 for presenting multi-modality content using visual and voice modalities of the user interface 140. In general, multiple pagination scenarios may exist for the pagination of the content portions 316A-E. However, some pagination scenarios may be more preferable than others. For example, if a set of instructions presented in one modality at a given time period does not present content that is substantially the same as content presented in another modality in the given time period, then the user may become confused when switching between the modalities. The differences in the presented content may be characterized by a pagination distance. The pagination distance is the number of inserts and removals of content portions into sets of instructions that must occur to make the content portions presented in one modality at a given time period the same as the content portions presented in another modality during the given time period.

In FIG. 8, the pagination distance is zero for the first time interval (in which presentations 803 and 808 are rendered) and for the second time interval (in which presentations 804 and 810 are rendered). That is to say, no content needs to be added or removed from the instructions in order to make the content portions presented in presentations 803 and 808 the same, or to make the content portions presented in presentations 804 and 810 the same.

In FIG. 9, the voice instructions 600 are paginated into a first set of instructions that generates an audio presentation 902 and a second set of instructions that generates an audio presentation 904. The voice pagination shown follows the sequence and pagination rules as described in the presentation information. However, the content portion 316D is no longer presented at the same time in the visual modality and the voice modality, as indicated by arrow 906. Here, the pagination distance of the pagination scenario 900 is two. One content portion, the content portion 316D, must be added to the visual instructions producing presentation 803 or removed from the voice instructions producing presentation 902 to make the content presented by the two modalities substantially the same during the first time interval. Similarly, the content portion 316D must be added to the visual instructions producing presentation 804 or removed from the voice instructions producing presentation 904 to make the content presented by the two modalities substantially the same in the second time interval. The user is not presented with the content portion 316D in the visual modality during the same time interval in which the user is presented with the content portion 316D in the voice modality. The pagination scenario 800 has a lower pagination distance (zero) than the scenario 900 (two).

FIG. 10 is an example of a schematic diagram of a third pagination scenario 1000 for presenting multi-modality content using visual and voice modalities of the user interface 140. Here, the second set of paginated visual instructions (producing presentation 804) is further paginated into two set of instructions producing presentations 1002 and 1004. In addition, the second set of paginated voice instructions producing presentation 810 is further paginated into two sets of instructions producing presentations 1006 and 1008. As a result, the content portion 316D is not presented during the same time interval within the visual modality and the voice modality, as indicated by arrow 1010. Also, the content portion 316C is not presented during the same time interval within the visual modality and the voice modality, as indicated by arrow 1012. In this example, the pagination distance for the first time interval is zero, for the second time interval is two, and for the third time interval is two. Two content portions must be added or removed in each of the second and third sets of paginated instructions to make the presented content substantially the same. The total pagination distance of the third pagination scenario 1000 is, therefore, four.

FIG. 11 is an example of a schematic diagram of a fourth pagination scenario 1100 for presenting multi-modality content using visual and voice modalities of the user interface 140. Here, the voice instructions producing presentation 810 are further paginated as shown in FIG. 10, but the second set of visual instructions producing presentation 804 remain as shown in FIG. 8. As the content portions 316A and 316D are presented during a first portion of the second time interval in the voice modality, they are also presented in the visual modality, as indicated by arrow 1102. As the content portions 316A and 316C are presented during a second portion of the second time interval in the voice modality, they also continue to be presented in the visual modality, as indicated by the arrow 816. This scenario 1100 may have a zero pagination distance, because the presentations 1006 and 1008 together may be compared to the presentation 804. Here, the preferred pagination scenario may depend on other factors, such as the content types presented or a personal preference of the user.

However, because presentation 1008 will not typically be rendered until a user issues a voice command (e.g., by speaking "next") to go to presentation 1008, a user may be confused or perceive a mismatch in content (i.e., a pagination distance). In some implementations, the mismatch of content shown in scenario 1000 may be represented by a fractional pagination distance.

The implementations described include, for example, various systems and processes. Implementations may include one or more devices configured to perform one or more processes. A device may include, for example, discrete or integrated hardware, firmware, and software. A device may include, for example, a processor, which refers to processing devices in general, including, for example, a microprocessor, an integrated circuit, or a programmable logic device. One implementation includes, therefore, a computer running a browser, or other software, for performing the functions of an adaptation manager. An adaptation manager may be, for example, local to a user (e.g. running on a user's personal computer), or remote from a user (e.g. running on an Internet Service Provider).

A device also may include one or more computer readable media having instructions for carrying out one or more processes. The computer readable medium may include, for example, a storage device such as, for example, a hard disk, a compact diskette, a random access memory ("RAM"), or a read-only memory ("ROM"). Instructions may be, for example, in hardware, firmware, or software. Instructions may be found in, for example, an operating system, a separate application, or a combination of the two. A processor may be characterized, therefore, as, for example, both a device configured to carry out a process and a device including computer readable media having instructions for carrying out a process.

A number of implementations have been described. Nevertheless, it will be understood that various modifications may be made. For example, implementations may provide content information and presentation information in a single source document, as suggested by FIG. 1, or in multiple documents. For example, a first source document may include content information and a second source document may include presentation information. Further, the presentation information may be divided among multiple source documents, such as, for example, in an implementation in which each of several containers is included in a separate source document. Additionally, elements of different described implementations may be combined, supplemented, modified, or removed to produce other implementations. Accordingly, other implementations are within the scope of the following claims.

What is claimed is:

1. A method comprising:

receiving a user input, the user input having been input in a user interlace in one of multiple modalities;

accessing, in response to receiving the user input, a multi-modality content document including content information and presentation information, the presentation information supporting presentation of the content information in each of the multiple modalities;

accessing, in response to receiving the user input, metadata for the user interface, the metadata indicating that the user interface provides a first modality and a second modality for interfacing with a user;

generating first-modality instructions based on the accessed multi-modality content document and the accessed metadata, the first-modality instructions providing instructions for presenting the content information on the user interface using the first modality; and generating second-modality instructions based on the accessed multi-modality content document and the accessed metadata, the second-modality instructions providing instructions for presenting the content information on the user interface using the second modality, wherein:

the content information includes a first content portion and a second content portion, the metadata includes a user interface attribute related to pagination, and generating the first-modality instructions and the second-modality instructions comprises:

determining a particular first-modality pagination describing pagination between the first content portion and the second content portion during presentation on the user interface using the first modality;

determining a particular second-modality pagination describing pagination between the first content portion and the second content portion during presentation on the user interface using the second modality, wherein the particular first-modality pagination and the particular second-modality pagination are determined based on (i) desired order of presentation of the first content portion and the second content portion in the first modality on the user interface, (ii) desired order of presentation of the first content portion and the second content portion in the second-modality on the user interface, and (iii) the user interface attribute related to pagination;

generating, based on the particular first-modality pagination, the first-modality instructions including instructions for (i) presenting the first content portion on the user interface during a first time interval, and (ii) presenting the second content portion on the user interface during a second time interval; and generating, based on the particular second-modality pagination, the second-modality instructions including instructions for (i) presenting the first content portion on the user interface during the first time interval, and (ii) presenting the second content portion on the user interface during the second time interval; and wherein generating the first-modality instructions and the second-modality instructions further comprises:

determining multiple first-modality paginations, including the particular first-modality pagination, describing pagination, between the first content portion and the second content portion during presentation on the user interface using the first modality;

determining multiple second-modality paginations, including the particular second-modality pagination, describing pagination between the first content portion and the second content portion during presentation on the user interface using the second modality, wherein each of the multiple first-modality paginations and second-modality paginations are determined based on (i) desired order of presentation of the first content portion and the second content portion in the first modality on the user interface, (ii) desired order of presentation of the first content portion and the second content portion in the second modality on the user interface, and (iii) the user interface attribute related to pagination;

forming a first pagination scenario, the forming including associating with a first of the multiple first-modality paginations a first of the multiple second-modality paginations;

determining for the first pagination scenario a first distance characterizing whether (i) the first content portion is configured to be presented on the user interface during a first common time interval using both the first modality and the second modality and (ii) the second content portion is configured to be presented on the user interface during a second common time interval using both the first modality and the second modality;

forming second pagination scenario, the forming including associating with a second of the multiple first-modality paginations a second of the multiple second-modality paginations;

determining for the second pagination scenario a second distance characterizing whether (i) the first content portion is configured to be presented on the user interface during a first common time interval using both the first modality and the second modality and (ii) the second content portion is configured to be presented on the user interface during a second common time interval using both the first modality and the second modality;

comparing the first distance with the second distance; and selecting a pagination scenario from the first pagination scenario and the second pagination scenario based on a result of the comparing.

2. The method of claim 1 wherein pagination is further based on other metadata.

3. The method of claim 1 wherein the user interface attribute includes a screen size indicator.

4. The method of claim 1 wherein:

the content information is divided into multiple elements, the first content portion includes at least a first of the multiple elements, the second content portion includes at least a second of the multiple elements, the first pagination scenario dictates when elements of the first content portion and elements of the second content portion are presented, determining the first distance comprises determining, for the first pagination scenario, a number of element-inserts and a number of element-removals that are required in order that (i) the first content portion is configured to be presented on the user interface during a first common time interval using both the first modality and the second modality and (ii) the second content portion is configured to be presented on the user interface during a second common time interval using both the first modality and the second modality, and the first distance is based on the number of element-inserts and the number of element-removals.

5. The method of claim 1 wherein selecting a pagination scenario from the first pagination scenario and the second pagination scenario based on a result of the comparing further includes selecting the pagination scenario based on the minimal pagination distance.

6. The method of claim 1 further comprising providing both the first-modality instructions and the second-modality instructions to the user interface.

7. The method of claim 1 wherein the presentation information of the multi-modality content document includes (i) a first layout container including presentation information for presenting content using the first modality and (ii) a second layout container including presentation information for presenting content using the second modality.

8. The method of claim 1 wherein the presentation information of the multi-modality content document includes a generic layout container including presentation information for presenting content using multiple modalities.

9. The method of claim 1 wherein generating the first-modality instructions comprises a browser generating the first-modality instructions for execution by a processor that controls the user interface.

10. The method of claim 1 wherein generating the first-modality instructions comprises generating a first-modality content document that includes the first-modality instructions.

11. The method of claim 10 wherein generating the first-modality content document comprises generating one or more of a Speech Recognition Grammar Specification (SRGS) document, a Hypertext Markup Language (HTML) document, a Voice Extensible Markup Language (VXML) document, or a Speech Synthesis Markup Language (SSML) document.

12. The method of claim 1 wherein the metadata further indicates one or more of (i) content types supported by the user interface or (ii) scalability of graphics on the user interface.

13. An apparatus comprising:

means for receiving a user input, the user input having be en input in a user interface in one of multiple modalities;

means for accessing, in response to receiving the user input, a multi-modality content document including content information and presentation information, the presentation information supporting presentation of the content information in each of the multiple modalities;

means for accessing, in response to receiving the user input, metadata tor the user interface, the metadata indicating that the user interface provides a first modality and a second modality for interfacing with a user;

means for generating first-modality instructions based on the accessed multi-modality content document and the accessed metadata, the first-modality instructions providing instructions for presenting the content information on the user interface using the first modality; and means for generating second-modality instructions based on the accessed multi-modality content document and the accessed metadata, the second-modality instructions providing instructions for presenting the content information on the user interface using the second modality, wherein:

the content information includes a first-content portion and a second content portion, the metadata includes a user interface attribute related to pagination, and generating the first-modality instructions and the second-modality instructions comprises:

determining a particular first-modality pagination describing pagination between the first content portion and the second content portion during presentation on the user interface using the first modality;

determining a particular second-modality pagination describing pagination between the first content portion and the second content portion during presentation on the user interface using the second modality, wherein the particular first-modality pagination and the particular second-modality pagination are determined based on (i) desired order of presentation of the first content portion and the second content portion in the first modality on the user interface, (ii) desired order of presentation of the first content portion and the second content portion in the second modality on the user interface, and (iii) the user interface attribute related to pagination;

generating, based on the particular first-modality pagination, the first-modality instructions including instructions for presenting the first content portion on the user interface during a first time interval, and (ii) presenting the second content portion on the user interface during a second time interval; and generating, based on the particular second-modality pagination, the second-modality instructions including instructions for (i) presenting the first content portion on the user interface during the first time interval, and (ii) presenting the second content portion on the user interface during the second time interval;

wherein generating the first-modality instructions and the second-modality instructions further comprises:

determining multiple first-modality paginations, including the particular first-modality pagination, describing pagination between the first content portion and the second content portion during presentation on the user interface using the first modality; and determining multiple second modality paginations, including the particular second-modality pagination, describing pagination between the first content portion and the second content portion during presentation on the user interface using the second modality, wherein each of the multiple first-modality paginations and second-modality paginations are determined based on (i) desired order of presentation of the first content portion and the second content portion in the first modality on the user interface, (ii) desired order of presentation of the first content portion and the second content portion in the second modality on the user interface, and (iii) the user interface attribute related to pagination;

forming a first pagination scenario, the forming including associating with a first of the multiple first-modality paginations a first of the multiple second-modality paginations;

determining for the first pagination scenario a first distance characterizing whether (i) the first content portion is configured to be presented on the user interface during a first common time interval using both the first modality and the second modality and (ii) the second content portion is configured to be presented on the user interface during a second common time interval using both the first modality and the second modality;

forming a second pagination scenario, the forming including associating with a second of the multiple first-modality paginations a second of the multiple second-modality paginations;

determining for the second pagination scenario a second distance characterizing whether (i) the first content portion is configured to be presented on the user interface during a first common time interval using both the first modality and the second modality and (ii) the second content portion is configured to be presented on the user interface during a second common time interval using both the first modality and the second modality;

comparing the first distance with the second distance; and selecting a pagination scenario from the first pagination scenario and the second pagination scenario based on a result of the comparing.

14. The apparatus of claim 13 wherein the means for generating the first-modality instructions is disposed local to the user interface.

15. An apparatus comprising a computer-readable medium that includes instructions for performing at least the following:

receiving a user input, the user input having been input in a user interface in one of multiple modalities;

accessing, in response to receiving the user input, a multi-modality content document including content information and presentation information, the presentation information supporting presentation of the content information in each of the multiple modalities;

accessing, in response to receiving the user input, metadata for the user interface, the metadata indicating that the user interface provides a first modality and a second modality for interfacing with a user;

generating first-modality instructions based on the accessed multi-modality content document and the accessed metadata, the first-modality instructions providing instructions for presenting the content information on the user interface using the first modality; and generating second-modality instructions based on the accessed multi-modality content document and the accessed metadata, the second-modality instructions providing instructions for presenting the content information on the user interface using the second modality, wherein:

the content information includes a first content portion and a second content portion, the metadata includes a user interface attribute related to pagination, and generating the first-modality instructions and the second-modality instructions comprises:

determining a particular first-modality pagination describing pagination between the first content portion and the second content portion during presentation on the user interface using the first modality;

determining a particular second-modality pagination describing pagination between the first content portion and the second content portion during presentation on the user interface using the second modality, wherein the particular first-modality pagination and the particular second-modality pagination are determined based on (i) desired order of presentation of the first content portion and the second content portion in the first modality on the user interface, (ii) desired order of presentation of the first content portion and the second content portion in the second modality on the user interface, and (iii) the user interface attribute related to pagination;

generating, based on the particular first-modality pagination, the first-modality instructions including instructions for (i) presenting the first content portion on the user interface during a first time interval, and (ii) presenting the second content portion on the user interface during a second time interval; and generating, based on the particular second-modality pagination, the second-modality instructions including instructions for (i) presenting the first content portion on the user interface during the first time interval, and (ii) presenting the second content portion on the user interface during the second time interval, wherein generating the first-modality instructions and the second-modality instructions further comprises:

determining multiple first-modality paginations, including the particular first-modality pagination, describing pagination between the first content portion and the second content portion during presentation on the user interface using the first modality; and determining multiple second-modality paginations, including the particular second-modality pagination, describing pagination between the first content portion and the second content portion during presentation on the user interface using the second modality, wherein each of the multiple first-modality paginations and second-modality paginations are determined based on (i) desired order of presentation of the first content portion and the second content portion in the first modality on the user interface, (ii) desired order of presentation of the first content portion and the second content portion in the second modality on the user interface, and (iii) the user interface attribute related to pagination;

forming a first pagination scenario, the forming including associating with a first of the multiple first-modality paginations a first of the multiple second-modality paginations;

determining for the first pagination scenario a first distance characterizing whether (i) the first content portion is configured to be presented on the user interface during a first common time interval using both the first modality and the second modality and (ii) the second content portion is configure to be presented on the user interface during a second common time interval using both the first modality and the second modality;

forming a second pagination scenario, the forming including associating with a second of the multiple first-modality paginations a second of the multiple second-modality paginations;

determining for the second pagination scenario a second distance characterizing whether the first content portion is configured to be presented on the user interface during a first common time interval using both the first modality and the second modality and (ii) the second content portion is configured to be presented on the user interface during a second common time interval using both the first modality and the second modality;

comparing the first distance with the second distance; and selecting a pagination scenario from the first pagination scenario and the second pagination scenario based on a result of the comparing.

16. The apparatus of claim 15 wherein the apparatus comprises one or more of a portable storage device or a processing device.

* * * * *